United States Patent Office 3,243,438
Patented Mar. 29, 1966

3,243,438
OCTAHYDRO PHENANTHRIDINE
COMPOUNDS
Joseph Hellerbach and Otto Schnider, Basel, Switzerland,
assignors to Hoffmann-La Roche Inc., Nutley, N.J., a
corporation of New Jersey
No Drawing. Filed Feb. 13, 1963, Ser. No. 258,159
Claims priority, application Switzerland, Feb. 23, 1962,
2,230/62
13 Claims. (Cl. 260—289)

The present invention relates to hydrophenanthridine compounds, and more particularly to 1,2,3,4,4a,5,6,10b-octahydrophenanthridine derivatives of the formula:

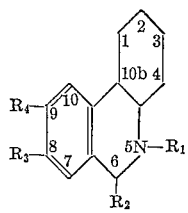

(I)

wherein $R_1$ is hydrogen, lower alkyl, lower alkenyl, or acyl; $R_2$ is lower alkyl; and $R_3$ and $R_4$ are hydrogen, methoxy, or, when taken together, methylenedioxy; and to processes for their preparation.

The invention also relates to the acid addition salts of the above compounds with pharmaceutically acceptable acids, e.g., mineral acids; such as hydrochloric acid, hydrobromic acid, hydroiodic acid, nitric acid, phosphoric acid, sulfuric acid, etc., and organic acids such as acetic acid, citric acid, tartaric acid, lactic acid, benzenesulfonic acid, toluenesulfonic acid, etc.

The lower alkyl and alkenyl groups in the above formula can be straight or branched chain hydrocarbon groups, e.g., methyl, ethyl, propyl, isopropyl, tertiary butyl, hexyl, allyl, α-methylallyl, β,β-dimethylallyl, etc. The acyl group in the above formula is an acid group of an aliphatic or aromatic carboxylic acid, for example, a lower alkanoyl group, e.g., acetyl, propionyl, etc.; aryl lower alkanoyl, preferably phenyl lower alkanoyl, e.g., phenylacetyl; or an aroyl group, preferably benzoyl or an alkyl substituted benzoyl group.

Preferred compounds of Formula I are those wherein both $R_3$ and $R_4$ are other than hydrogen, i.e., where $R_3$ and $R_4$ are both methoxy or, when taken together, methylenedioxy.

The process of the invention is carried out by reducing a hexahydrophenanthridine compound of the formula:

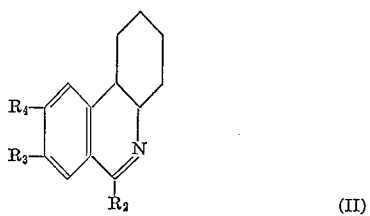

(II)

wherein $R_2$, $R_3$, and $R_4$ have the above meaning, and optionally alkylating, alkenylating, or acylating the secondary base obtained, and/or optionally converting the product into an acid addition salt.

The hexahydrophenanthridine compounds of Formula II employed as starting materials can be prepared according to the following process:

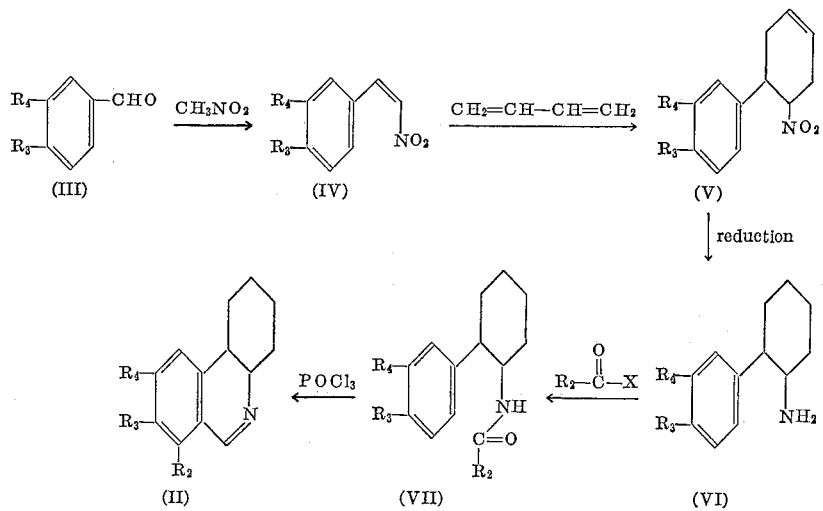

In the above reaction scheme $R_2$, $R_3$ and $R_4$ have the meanings given above for Formula I, and X is halogen,

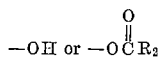

$-OH$ or $-O\overset{O}{\underset{\|}{C}}R_2$

In the above process, a benzaldehyde of Formula III is reacted with nitromethane, preferably in a suitable solvent such as a lower alkanol, e.g., ethanol, to form an ω-nitrostyrene of Formula IV. The latter compound is reacted in a Diels-Alder reaction with 1,3-butadiene, preferably in a suitable solvent, e.g., a hydrocarbon or halogenated hydrocarbon solvent such as chloroform or toluene at an elevated temperature, to form a compound of Formula V. The latter compound is hydrogenated to the corresponding substituted cyclohexylamine of Formula VI, for example, by catalytic hydrogenation in the presence of a suitable hydrogenation catalyst, such as Raney nickel, etc. The cyclohexylamine derivative of Formula VI is acylated, according to known methods, to give a compound of Formula VII. Lastly, the compound of Formula VII is cyclized, whereupon the starting material of Formula II is obtained.

The reduction of the hexahydrophenanthridine of Formula II to the octahydrophenanthridine of Formula I can be carried out by treatment of (II) with a Group I–Group III metal hydride, e.g., an alkali metal aluminum hydride, such as lithium aluminum hydride, or an alkali metal borohydride, such as sodium borohydride or potassium borohydride, etc. It is preferable to carry out the reduction in the presence of an organic solvent inert to the hydride reducing agent. Where sodium borohydride is employed, the reduction can be carried out in a lower alkanol such as methanol, suitably at room temperature. The reduction can also be carried out in the presence of hydrogen using a hydrogenation catalyst such as Raney nickel, platinum oxide, palladium, etc. The compound of Formula II can be employed in the reduction in the form of its free base or in the form of an acid addition salt, for example, a salt with a mineral acid such as a hydrohalic acid, e.g., hydrochloric acid, hydrobromic acid, etc., or perchloric acid, etc.

The reduction of the compounds of Formula II to compounds of Formula I wherein $R_1$ is hydrogen, gives rise to an additional new asymmetric center on the carbon atom $C_6$. When reducing with the aid of a Group I–Group III metal hydride, especially with sodium- or potassium borohydride, then, often a sterically uniform product is obtained. As an example, when reducing 6-methyl-8,9-methylenedioxy-1,2,3,4,4a,10b-hexahydrophenanthridine (M.P. of the hydrochloride salt at 249–251°) to 6-methyl-8,9-methylenedioxy-1,2,3,4,4a,5,6,10b-octahydrophenanthridine, a uniform octahydro compound is obtained in good yield and of a melting point of 85–87° (M.P. of the hydrochloride salt at 275–276°). When using other reducing agents, e.g., by reducing with catalytically activated hydrogen, mixtures of stereoisomeric racemates can be formed.

In an additional optional step, the secondary amino group of the 1,2,3,4,4a,5,6,10b-octahydrophenanthridine compound of Formula I wherein $R_1$ is hydrogen, i.e., the product of the reduction reaction of the invention, can be alkylated, alkenylated, or acylated to form a compound of Formula I wherein $R_1$ is other than hydrogen. The N-acylated derivative can, if desired, be treated with a suitable reducing agent, such as lithium aluminum hydride to form the corresponding N-alkyl derivative. The N-methyl derivative can also be prepared by reacting the compound of Formula I wherein $R_1$ is hydrogen with formaldehyde, and then chemically (with formic acid) or catalytically reducing the resulting reaction product. N-lower alkenyl and N-lower alkyl derivatives can be readily obtained by treatment with a lower alkenyl or lower alkyl halide. Suitable acylating agents for preparing the N-acylated derivatives are the corresponding aliphatic or aromatic carboxylic acids, or reactive functional derivatives thereof, such as their anhydrides or halogenides. The secondary or tertiary amines of the invention can be converted into their acid addition salts through treatment with pharmaceutically acceptable organic or inorganic acids.

The products of the invention exhibit analgesic, antiinflammatory and antipyretic activity, and are useful as analgesic, anti-inflammatory, and antipyretic agents.

*Example 1*

120 g. of 6-methyl-8,9-methylenedioxy-1,2,3,4,4a,10b-hexahydrophenanthridine are dissolved in 1300 ml. of methanol. To this solution there is added, under continuous stirring at a temperature of about 15° C., 60 g. of sodium borohydride in small portions, and the stirring continued for an additional 16 hours at room temperature. Thereafter, the resulting mixture is cooled to 0° C. and 2 N sulfuric acid added thereto with stirring until the mixture is acid to Congo paper, whereupon the reduction product begins to precipitate in the form of the neutral sulfate. After allowing it to stand, the mixture is filtered and the precipitate washed with a small quantity of water, and then dried. 91.5 g. of 6-methyl-8,9-methylenedioxy-1,2,3,4,4a,5,6,10b-octahydrophenanthridine in the form of its sulfate of melting point 265–270° is obtained thereby. After working up the mother liquor an additional 25 g. of product can be isolated. The sulfate is converted into the free base through treatment with dilute sodium hydroxide solution. The base is then treated with alcoholic HCl to yield 6-methyl-8,9-methylenedioxy-1,2,3,4,4a,5,6,10b-octahydrophenanthridine hydrochloride in the form of the dihydrate of melting point 258–259° C. (Melting point of the anhydrous product, 275–276° C.) The free base melts at 85–87° C.

The starting material can be prepared from piperonal and nitromethane according to the following process:

210 g. of piperonal is dissolved in a mixture of 280 ml. of ethanol and 91 ml. of nitromethane. After the addition of 7 g. of methylamine hydrochloride and 4 g. of calcinated sodium carbonate, the solution is allowed to stand at room temperature for 72 hours. The precipitated reaction product is filtered off and dried, whereupon 262 g. of 1-nitro-2-(3,4-methylenedioxy-phenyl)ethylene of melting point 158–159° C. is obtained.

100 g. of the above compound is mixed with a solution of 100 g. of 1,3-butadiene in 1000 ml. of chloroform and 500 mg. of hydroquinone and maintained in a pressure autoclave during 24 hours under a nitrogen atmosphere at a pressure of 20 atmospheres and a temperature of 140° C. Thereafter the chloroform is distilled off and the residue, except for an insoluble portion, is dissolved in ether, and the ether solution treated with dilute sodium hydroxide, water, dilute hydrochloric acid, and once again with water. The ether solution is concentrated and maintained at 0°, whereupon 74 g. of 2-(3,4-methylenedioxyphenyl)-1-nitro-cyclohexene-(4) of melting point 95–97° crystallizes out.

120 g. of the above compound is dissolved in 3000 ml. of methanol and hydrogenated in the presence of 100 g. of Raney nickel and 7 ml. of 5 percent aqueous palladium chloride solution at room temperature and under normal pressure. After an initial takeup of 4 moles of hydrogen, the hydrogenation ceases. Thereafter the catalyst is removed, the filtrate treated with alcoholic HCl until it is acid to Congo paper, and the acid solution concentrated in vacuo until the crude hydrochloride of the base precipitates. This is filtered off, heated with 500 ml. of acetone, filtered off again and recrystallized from alcohol/ether, whereupon 113 g. of 2-(3,4-methylenedioxyphenyl)cyclohexylamine hydrochloride of melting point 261–262° C. is obtained.

51 g. of the above material in the form of its free base, which is obtained by destruction of the hydrochloride salt with sodium hydroxide and the usual workup, is treated with 15 ml. of dry pyridine and then, dropwise with stirring, is added 39 g. of acetic anhydride, while allowing the reaction temperature to climb to 80° C. After heating the mixture at 100° for 2 hours the excess acetic anhydride and the acetic acid which is formed is removed under vacuum. The residue is taken up in ether, then treated respectively with 3 N hydrochloric acid, water, 2 N sodium carbonate and again with water, whereupon, after evaporation of the ether and recrystallization of the residue from isopropyl ether-petroleum ether, 41,4 g. of 2-(3,4-methylenedioxyphenyl)-N-acetylcyclohexylamine of melting point 126–127° C. is obtained.

130.5 g. of the above material in 650 ml. of absolute benzene is heated with 100 g. of phosphorus oxychloride with stirring under reflux for 2½ hours. After a heating time of 20 minutes, a precipitate begins to form. After the end of the reaction, the benzene is removed under vacuum and the residue hydrolyzed by the addition of 500 ml. of ice water. After removal of the ether soluble portion by washing with ether, the acidic aqueous solution with proper cooling is treated with ammonia solution until alkaline to phenolphthalein, whereupon 6 - methyl - 8,9 - methylenedioxy - 1,2,3,4,4a,10b-hexahydrophenanthridine in the form of the free base precipitates, and is taken up in ether. After evaporation of the ether, 120 g. of the base remains. The hydrochloride formed from the base melts at 249–251° C.

When the above described Diels-Alder addition between the styrene derivative and butadiene under the same conditions is carried out in toluene instead of in chloroform, there is obtained an isomer of the nitrocyclohexene derivative of melting point 88–90° C., which after reduction gives 2-(3,4-methylenedioxyphenyl)-cyclohexylamine; the hydrochloride of which melts at 209–210°C. This amine is acetylated as described above, whereupon a 2-(3,4-methylenedioxyphenyl)-N-acetylcyclohexylamine of melting point 150–151° C. is obtained. After the cyclization and further reduction steps as described above, the octahydrophenanthridine derivative is obtained, which is an isomer of 6-methyl-8,9-methylenedioxy - 1,2,3,4,4a,5,6,10b - octahydrophenanthridine; the hydrochloride of which melts at 252–254° C.

Following the procedure of Example 1 there is obtained:

From 6 - ethyl - 8,9 - methylenedioxy - 1,2,3,4,4a,10b-hexahydrophenanthridine is obtained 6-ethyl-8,9-methylenedioxy - 1,2,3,4,4a,5,6,10b - octahydrophenanthridine (melting point of the hydrochloride, 269–270°).

From 6-tert. butyl-8,9-methylenedioxy-1,2,3,4,4a,10b-hexahydrophenanthridine (melting point of the hydrochloride, 155–156°) is obtained 6-tert. butyl-8,9-methylenedioxy - 1,2,3,4,4a,5,6,10b - octahydrophenanthridine (melting point of the hydrochloride, 304–305°).

From 6 - methyl - 8,9 - dimethoxy - 1,2,3,4,4a,10b-hexahydrophenanthridine is obtained 6-methyl-8,9-dimethoxy - 1,2,3,4,4a,5,6,10b - octahydrophenanthridine (melting point of the hydrochloride, 300° C.).

*Example 2*

31 g. of 6-methyl-8,9-methylenedioxy-1,2,3,4,4a,5,6,10b-octahydrophenanthridine (melting point, 85–87° C.), 31 ml. of 38 percent formaldehyde solution, and 62 ml. of 100 percent formic acid are heated for 5 hours at 75° C. Thereafter, the reaction mixture is concentrated under vacuum, the residue dissolved in water and concentrated ammonia solution added thereto until an alkaline reaction is obtained. After taking up the base in ether, the ether solution is washed until neutral and concentrated, whereupon 31.5 g. of 5,6-dimethyl-8,9-methylenedioxy - 1,2,3,4,4a,5,6,10b - octahydrophenanthridine precipitates as an oily material. Through treatment with alcoholic HCl there is obtained 33 g. of the hydrochloride (melting point 271–273° C. from alcohol/ether).

Analogously to the procedure of Examples 1 and 2 there is obtained:

From 6 - isopropyl - 8,9-methylenedioxy-1,2,3,4,4a,10b-hexahydrophenanthridine is obtained 6-isopropyl-8,9-methylenedioxy - 1,2,3,4,4a,5,6,10b-octahydrophenanthridine (melting point of the hydrochloride, 273–274° C.); and 5-methyl-6-isopropyl-8,9-methylenedioxy-1,2,3,4,4a,5,6,10b-octahydrophenanthridine (melting point of the hydrochloride, 235° C.).

*Example 3*

4.9 g. of 6-methy-8,9-methylenedioxy-1,2,3,4,4a,5,6,10b-octahydrophenanthridine (melting point 85–87°), 2.66 g. of allyl bromide, and 2.76 g. of calcined potash in 25 ml. of dimethyl formamide are heated to 100° C. during 3 hours. Thereafter the reaction mixture is filtered and the filtrate evaporated to dryness. The residue is taken up in ether, the ether solution neutralized, washed, dried, and concentrated to yield 5.4 g. of 5-allyl-6-methyl-8,9 - methylenedioxy-1,2,3,4,4a,5,6,10b-octahydrophenanthridine, the hydrochloride of which melts at 207° C. (from ethanol/ether).

*Example 4*

8 g. of 6-methyl-8,9-methylenedioxy-1,2,3,4,4a,5,6,10b-octahydrophenanthridine (melting point 85–87° C.) is heated under reflux for 3 hours with 30 ml. of acetic anhydride. Thereafter, the reaction mixture is concentrated to dryness under vacuo and the residue taken up in ether. After shaking the ether solution with dilute HCl, water, sodium carbonate solution, and lastly with water, there is obtained 5-acetyl-6-methyl-8,9-methylenedioxy-1,2,3,4,4a,5,6,10b-octahydrophenanthridine, which after recrystallization twice from isopropyl ether melts at 147–149° C.

We claim:

1. A compound selected from the group consisting of (a) a compound of the formula

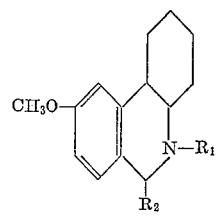

wherein $R_1$ is selected from the group consisting of hydrogen, lower alkyl, lower alkenyl, lower alkanoyl, phenyl-lower alkanoyl, benzoyl, and alkyl-substituted benzoyl, and $R_2$ is lower alkyl and (b) an acid addition salt thereof with a pharmaceutically acceptable acid.

2. A compound selected from the group consisting of (a) a compound of the formula

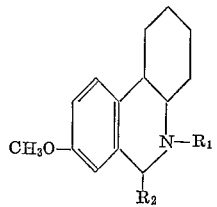

wherein $R_1$ is selected from the group consisting of hydrogen, lower alkyl, lower alkenyl, lower alkanoyl, phenyl-lower alkanoyl, benzoyl, and alkyl-substituted benzoyl, and $R_2$ is lower alkyl and (b) an acid addition salt thereof with a pharmaceutically acceptable acid.

3. A compound selected from the group consisting of (a) a compound of the formula

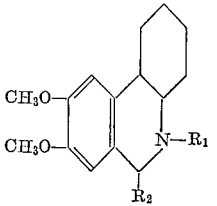

wherein $R_1$ is selected from the group consisting of hydrogen, lower alkyl, lower alkenyl, lower alkanoyl, phenyl-lower alkanoyl, benzoyl, and alkyl-substituted benzoyl, and $R_2$ is lower alkyl and (b) an acid addition salt thereof with a pharmaceutically acceptable acid.

4. A compound selected from the group consisting of (a) a compound of the formula

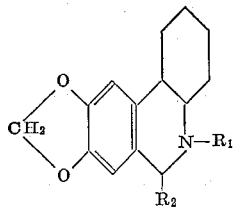

wherein $R_1$ is selected from the group consisting of hydrogen, lower alkyl, lower alkenyl, lower alkanoyl, phenyl-lower alkanoyl, benzoyl, and alkyl-substituted benzoyl, and $R_2$ is lower alkyl and (b) an acid addition salt thereof with a pharmaceutically acceptable acid.

5. 6-methyl-8,9-methylenedioxy-1,2,3,4,4a,5,6,10b-octahydrophenanthridine.

6. 6-ethyl-8,9-methylenedioxy-1,2,3,4,4a,5,6,10b-octahydrophenanthridine.

7. 6-tert. butyl-8,9-methylenedioxy-1,2,3,4,4a,5,6,10b-octahydrophenanthridine.

8. 6-methyl-8,9-dimethoxy-1,2,3,4,4a,5,6,10b-octahydrophenanthridine.

9. 5,6 - dimethyl-8,9-methylenedioxy-1,2,3,4,4a,5,6,10b-octahydrophenanthridine.

10. 6 - isopropyl-8,9-methylenedioxy-1,2,3,4,4a,5,6,10b-octahydrophenanthridine.

11. 5-methyl-6-isopropyl-8,9-methylenedioxy-1,2,3,4,4a,5,6,10b-octahydrophenanthridine.

12. 5 - allyl-6-methyl-8,9-methylenedioxy-1,2,3,4,4a,5,6,10b-octahydrophenanthridine.

13. 5 - acetyl-6-methyl-8,9-methylenedioxy-1,2,3,4,4a,5,6,10b-octahydrophenanthridine.

References Cited by the Examiner

Manske et al., The Alkaloids, volume II, Academic Press, 1952, pages 347, 348 and 350 relied upon.

Manske et al., The Alkaloids, volume VI, Academic Press, 1962, page 330 relied upon.

Bohlmann, Ber. Deut. Chem., volume 85, pages 390–4, 1952.

Finkelstein et al., J. Am. Chem. Soc., volume 72, pages 3282–3, 1950

Nomura et al., J. Pharm. Soc. Jap., volume 77, pages 270–4, 1957.

HENRY R. JILES, *Acting Primary Examiner.*

D. N. KERR, D. G. DAUS, *Assistant Examiners.*